United States Patent
Rajendran et al.

(10) Patent No.: US 12,436,045 B2
(45) Date of Patent: Oct. 7, 2025

(54) HIGH ACCURACY ON-CHIP TEMPERATURE SENSOR SYSTEM AND METHOD THEREOF

(71) Applicant: Steradian Semiconductors Private Limited, Bengaluru (IN)

(72) Inventors: Gireesh Rajendran, Bengaluru (IN); G. Ranjithkumar, Bengaluru (IN)

(*) Notice: Subject to any disclaimer, the term of this patent is extended or adjusted under 35 U.S.C. 154(b) by 641 days.

(21) Appl. No.: 17/855,813

(22) Filed: Jul. 1, 2022

(65) Prior Publication Data
US 2023/0296451 A1    Sep. 21, 2023

(30) Foreign Application Priority Data
Mar. 17, 2022  (IN) .............. 202241014929

(51) Int. Cl.
*G01K 15/00* (2006.01)
*G01K 1/02* (2021.01)
*G01K 7/00* (2006.01)

(52) U.S. Cl.
CPC .......... *G01K 15/005* (2013.01); *G01K 1/026* (2013.01); *G01K 7/00* (2013.01); *G01K 2219/00* (2013.01)

(58) Field of Classification Search
CPC ........ G01K 1/026; G01K 7/00; G01K 15/005; G01K 2219/00
See application file for complete search history.

(56) References Cited

U.S. PATENT DOCUMENTS

2022/0102963 A1* 3/2022 Takahata .............. G01K 7/16
2022/0357215 A1* 11/2022 Zhang .................. G01K 7/203

* cited by examiner

*Primary Examiner* — Randy W Gibson

(57) ABSTRACT

According to an aspect, a temperature sensor in a chip for determining a chip temperature comprises a first temperature sensor with a first characteristic, a second temperature sensor with a second characteristic, first characteristic being different from the second characteristic, a processor operative to determine the chip temperature is configured to determine a first parameter and a second parameter in the calibration mode and determining the chip temperature using the first parameter and the second parameter in a real time operating mode, wherein, the first parameter is derived from a first relation between the first characteristic and the second characteristic and the second parameter is at least based on first parameter.

5 Claims, 6 Drawing Sheets

HIGH ACCURACY ON-CHIP TEMPERATURE SENSOR SYSTEM AND METHOD THEREOF

CROSS REFERENCES TO RELATED APPLICATIONS

This application claims priority form Indian Patent Application No. 202241014929 filed on Mar. 17, 2022 which is incorporated herein in its entirety by reference.

BACKGROUND

Technical Field

Embodiments of the present disclosure relate generally to integrated circuits devices and more specifically to high accuracy On-Chip temperature sensor system and method thereof.

Related Art

Integrated circuits also referred to as IC or chip consists several semiconductor devices such as transistors, resistors, capacitors formed on a semiconductor substrate and are coupled together (thus forming electronic circuits) to perform one or more desired operations. The chip is fabricated with micro and nano (micrometer and nanometer) sized devices enabling incorporation of a very large scale circuit within a chip. Often devices inside the chip and/or the chip as a whole get heated up due to the operational current, frequency and other internal and external factors. The increase in the temperature of the chip may affect the performance of the chip and its functionality. In certain condition, the chip may become non-operative, malfunction due to changing operating point or get completely burnt if the remedial actions such as turning off the circuit, placing the IC or section thereof in the sleep mode etc., are taken. Thus, it is essential to measure the chip temperature accurately to take desired action to prevent the malfunction of the chip.

Several conventional temperature measurement techniques are employed to measure the chip temperature. However, such conventional temperature measurement techniques provide less accurate measurement of the chip temperature. For example, the conventional techniques of measuring temperature may provide an accuracy of ±10 degree Celsius. That means, when the real temperature of the chip is 90 degree Celsius, the conventional technology may indicate the temperature in the range of 80-100 degree Celsius. That means, due to such low accuracy in measurement, the chip shall be limited to operate at a temperature range that is (approximately 10%) less than possible real range, for example.

As is well known, temperature sensors using (bipolar) transistors as the core sensing device is popular in integrated circuits. These temperature sensors are used to sense the chip temperature during device operation and to perform various corrective actions. Shutting down the power sections when the temperature is high or for loading temperature dependent calibrations are examples of this. Accuracy of on-chip temperature sensor is critical for ensuring that the correct calibration for temperature is applied as well as to take critical actions in case of the temperature exceeding safe operating range. The conventional temperature measurement techniques fail to provide better accuracy due to the inconsistent reference, dependency on the device parameters, poor calibration of the temperature sensor etc.

In one conventional on-chip temperature measurement technique which is more fully described in the U.S. Pat. No. 8,915,646, the technique uses a combination of 3 samples derived from the temperature sensor, where the signal is defined as the difference of second and first and the second signal defined as the difference between third and first sample. Samples are defined with varying excitations while maintaining the excited device or the native sensor to be kept the same. This helps in cancelling the error of the native sensor element if the excitation is known. However, this technique exhibits limitations such as any excitation method used to define the three samples will always have one or more of the elements varying. This effectively transfers the error from the native sensor to the excitation element. Secondly, dynamic element matching can be used as proposed therein but this increases the circuit complexity.

In another conventional on-chip temperature measurement technique which is more fully described in the U.S. patent Ser. No. 10/642,305, the technique uses a reference and proportional to temperature voltages are generated from a first voltage inversely proportional to temperature and the second voltage proportional to temperature. Options to scale the reference voltage independently by additional proportional to temperate current at node N4 are provided. This can be used to reduce any error, temperature dependent or otherwise by controlling IPTAT (as defined the reference) node N4 However, this technique exhibits limitations such as, even though it provides an option to adjust for any variation of reference with temperature, the accuracy of this circuit will still be limited by analog impairments like the op-amp gain, bipolar matching etc.

SUMMARY

According to an aspect, a temperature sensor in a chip for determining a chip temperature comprises a first temperature sensor with a first characteristic, a second temperature sensor with a second characteristic, first characteristic being different from the second characteristic, a processor operative to determine the chip temperature is configured to determine a first parameter and a second parameter in the calibration mode and determining the chip temperature using the first parameter and the second parameter in a real time operating mode, wherein, the first parameter is derived from a first relation between the first characteristic and the second characteristic and the second parameter is at least based on first parameter.

According to another aspect, the first parameter is a relative slope "S" and the first relation is represented as $S=(T2-T1)/(R2-R1)$, in that, R1 is the first characteristic determined at a first temperature T1 and R2 is the second characteristic determined at a second temperature T2 subjected to the chip in the calibration mode. According to yet another aspect, the second parameter is an offset "O" and is based on the relative slope by relation $O=T2-(S*R2)$. In that, the $R1=V1/V2$ and $R2=V3/V4$, in that V1 and V2 are voltages provided by first temperature sensor and the second temperature sensor respectively when the chip is subjected to the first temperature and V3 and V4 are voltages provided by first temperature sensor and the second temperature sensor respectively when the chip is subjected to the second temperature. According to another aspect, a multiplexer selectively couples output of one of the first temperature sensor and the second temperature sensor to the ADC for processing.

Several aspects are described below, with reference to diagrams. It should be understood that numerous specific details, relationships, and methods are set forth to provide a full understanding of the present disclosure. One who skilled in the relevant art, however, will readily recognize that the present disclosure may be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
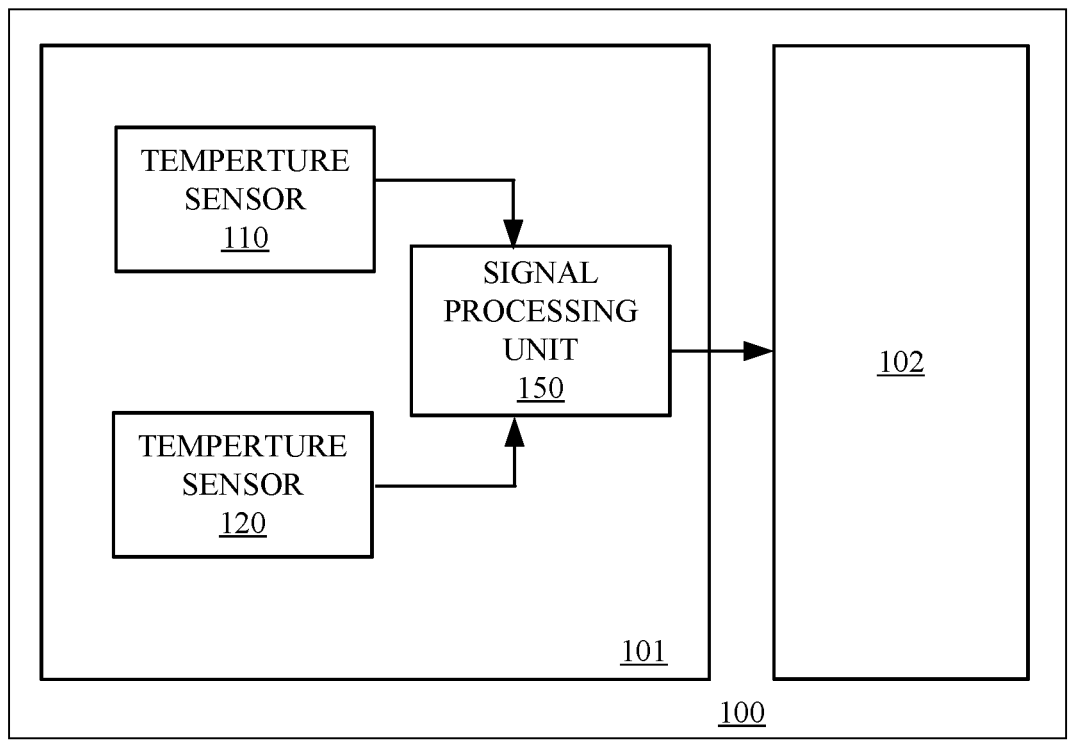
FIG. 1 is a block diagram of an example chip in an embodiment.

FIG. 1 is a block diagram of an example chip in an embodiment. The chip 100 is shown comprising the on-chip temperature sensing system 101 and the functional circuit block 102. The on-chip temperature sensing system 101 is shown comprising a first temperature sensor 110 and a second temperature sensor 120 and signal processing unit 150. Accordingly, the temperature sensing system 101 employs more than one temperature sensors on the chip 100. In that, the temperature sensing characteristics of the first sensor 110 is different from the temperature sensing characteristic of the second sensor 120. In one embodiment the temperature sensing characteristic comprises a relation between the temperature and the corresponding electric signal value generated by the sensors 110 and 120 representing the temperature. Electric signal value may be one of an electric current and a voltage.

Figure 2A:
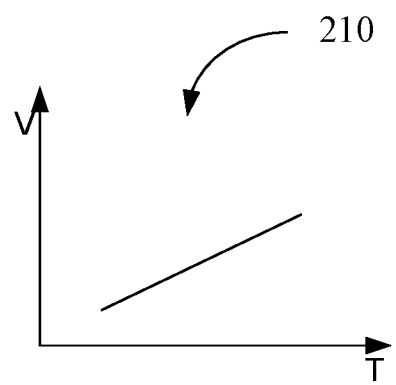
FIGS. 2A and 2B illustrate example temperature sensing characteristics of the first sensor and the second sensor respectively in one embodiment.
Figure 2B:
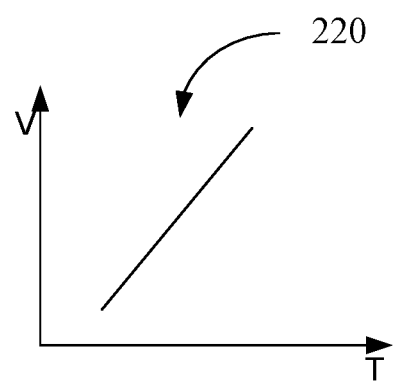

FIGS. 2A and 2B illustrate example temperature sensing characteristics of the first sensor and the second sensor respectively in one embodiment. In the Figure, the X-axis representing the temperature and Y-Axis representing the magnitude of voltage/current. As shown there the first characteristic 210 is linear slope $K_1$ corresponding to a relation: $I=K_1T$. The second relation 220 represents a linear slope $K_2$ corresponding to relation $I=K_2T$, wherein I represents the electric signal strength (current) generated by the respective sensors corresponding to the temperature sensed (T). Apparently, for the same temperature, the two sensors 110 and 120 provide different current value. The characteristic is illustrated as linear slope (relation) merely as an example while not excluding any other relations such as quadratic, logarithmic etc. Further, the characteristic may also be of the form $I=K_xT+C$, wherein C may be a constant representing an offset.

The signal processing unit 150 receives the electrical signals (current or voltage) from the first sensor 110 and the second sensor 120 and determines the chip temperature with a higher level of accuracy. The signal processing unit 150 sends a warning signal to the functional circuit block 102 when the temperature is determined to have exceeded a threshold value. Alternately, signal processing unit 150 may send number of different alarm/warning signals to the functional circuit block 102 at corresponding different temperature values. The threshold and/or the different temperature values may be preset and stored in a memory (not shown). The functional circuit block 102 may perform several remedial actions to reduce the temperature and/or prevent the malfunctioning of the chip. The remedial action may comprise turning off some/certain section of the circuit, cutting off power to certain part of the chip, reducing the frequency of operation etc.

Figure 3B:
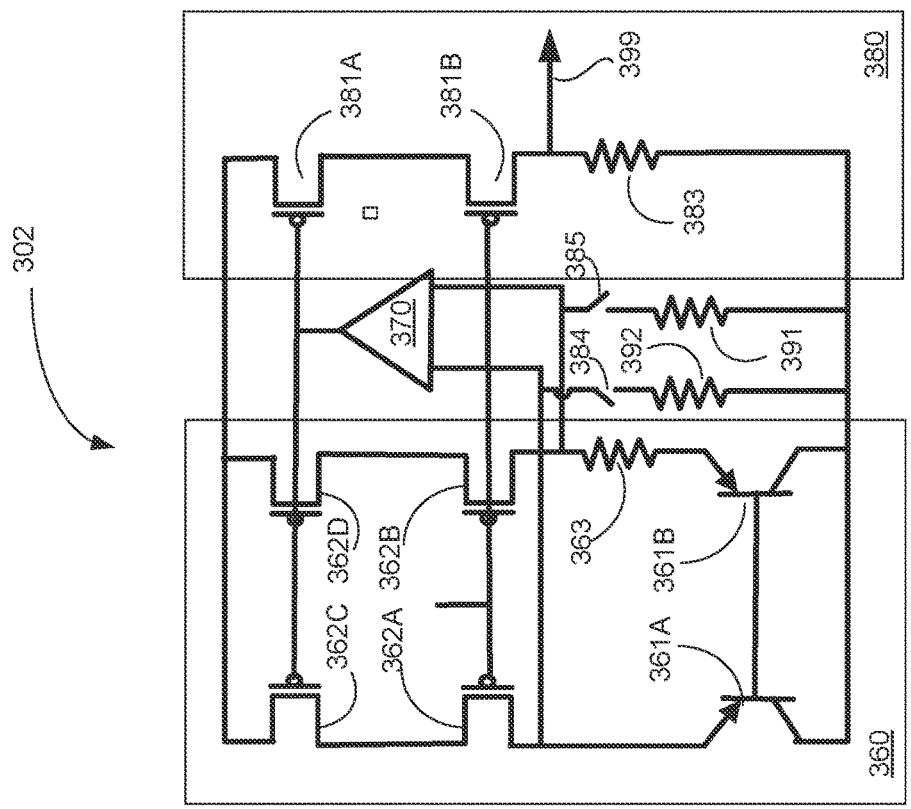
FIGS. 3A and 3B illustrates example first and second sensors 110 and 120 in an embodiment.
Figure 3A:
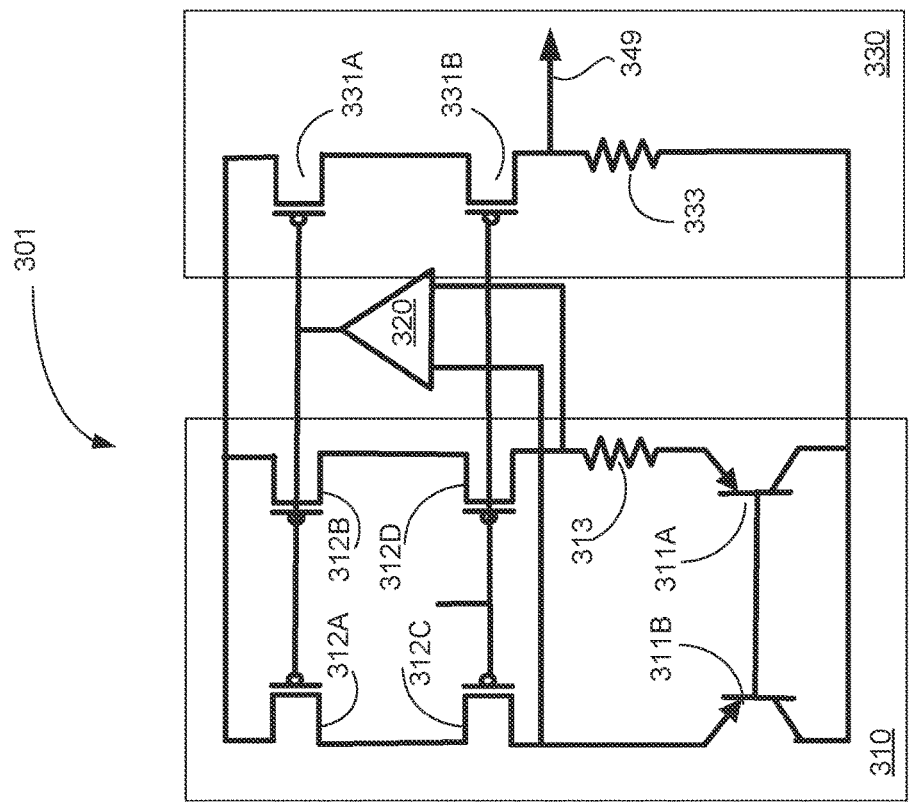

FIGS. 3A and 3B illustrates example first and second sensors 110 and 120 in an embodiment. In that, FIG. 3A representing the first sensor 110 and the FIG. 3B representing the second sensor 120. Referring to the FIG. 3A, the sensor 301 is formed by temperature sensing core 310 comprising the bipolar transistors 311A and 311B, MOS transistors 312A-312D and resistor 313. The amplifier 320 acts as the control loop to stabilize the circuit in its correct operating point. The signal representing the temperature sensed is mirrored by transistors 331A-B and provided at the output point 349 across the resistor 333. The sensor 301 provides the temperature voltage relation with a first slope.

Similarly, referring to FIG. 3B the sensor 302 is formed by temperature sensing core 360 comprising the bipolar transistors 361A and 361B, MOS transistors 362A-362D and resistor 363. The bleeder resistors 391 and 392 provide different signal slope with respect to temperature. The amplifier 370 acts as the control loop to stabilize the circuit in its correct operating point. The signal representing the temperature sensed is mirrored by transistors 381A-B and provided at the output point 399 the resistor 383. The bleeder resistors 391 and 392 provide different slope at the output 399 as compared to the first slope at the output 349. While sensors 301 and 302 serves as an example, the topology of the circuit is not limiting to the scope of the disclosure as any known on-chip temperature sensors topology/technology may be implemented in place of 301 and 302 for providing different sensor characteristic. All such technologies/topologies are made part of this disclosure. Further, the sensors 301 and 302 are shown as two independent elements, the sensors 301 may be implemented within the 302. For example, the switches 384 and 385 may be operated to convert the sensor 302 to operate at two different slopes. That is when the switches 384 and 385 are closed, the sensor 302 operates as second sensor 120 and when the switches 384 and 385 are in open state, the sensor 302 operates as sensor 110. Thus, the space and number of components may also be reduced. The manner in which the signal processor 150 operates to determine the chip temperature from the two sensors output 349 and 399 is further disclosed below.

Figure 4:
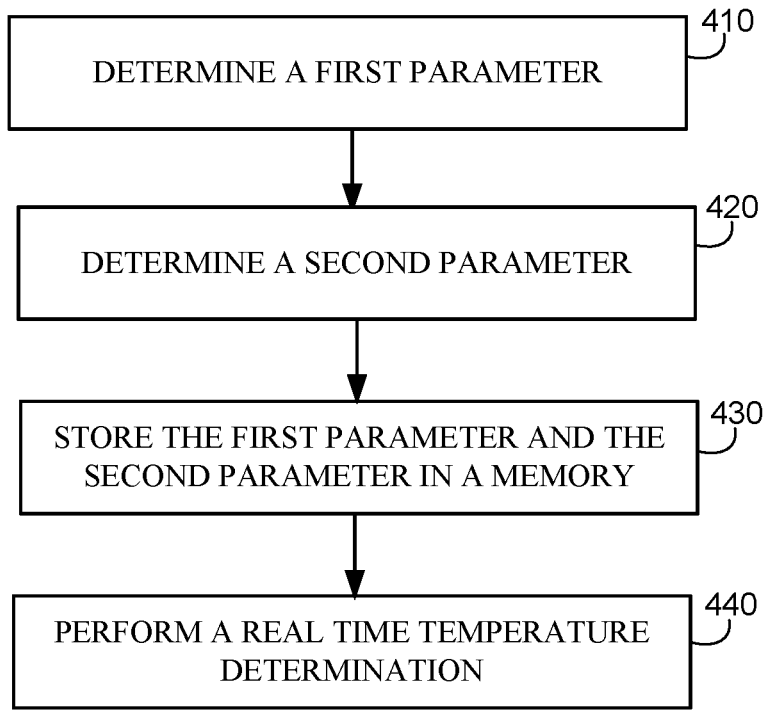
FIG. 4 is a block diagram illustrating the manner in which the chip temperature may be determined more accurately in an embodiment.

FIG. 4 is a block diagram illustrating the manner in which the chip temperature may be determined more accurately in an embodiment. In the block 410, the signal processor 150 determines a first parameter representing the relation between the first characteristic and the second characteristic of the sensors 301 and 302. In the block 420, the signal processor 150 determines a second parameter from the first parameter. In one embodiment, the second parameter may be derived from the first parameter and the measurements received on path 349 and 399. In block 430, the signal processor 150 stores the first parameter and the second parameter in a memory. The determination of first and second parameter in the block 410-430 may be performed in a calibration mode or during initial set up. In that, the chip may be subjected to known temperatures. In block 440, signal processor 150 perform a real time temperature determination using the signal received on the path 349, 399, first parameter and the second parameter. Due to the use of two sensors, the errors are cancelled and the temperature measured is free from at least some of the errors. The errors in the temperature sensors 110/301 and 120/302, such as first order error, second order error may get cancelled due to the use of two sensors 110 and 120, and the characteristic relation between them. The manner in which the first and the second parameters may be determined in an embodiment is further described below.

Figure 5:
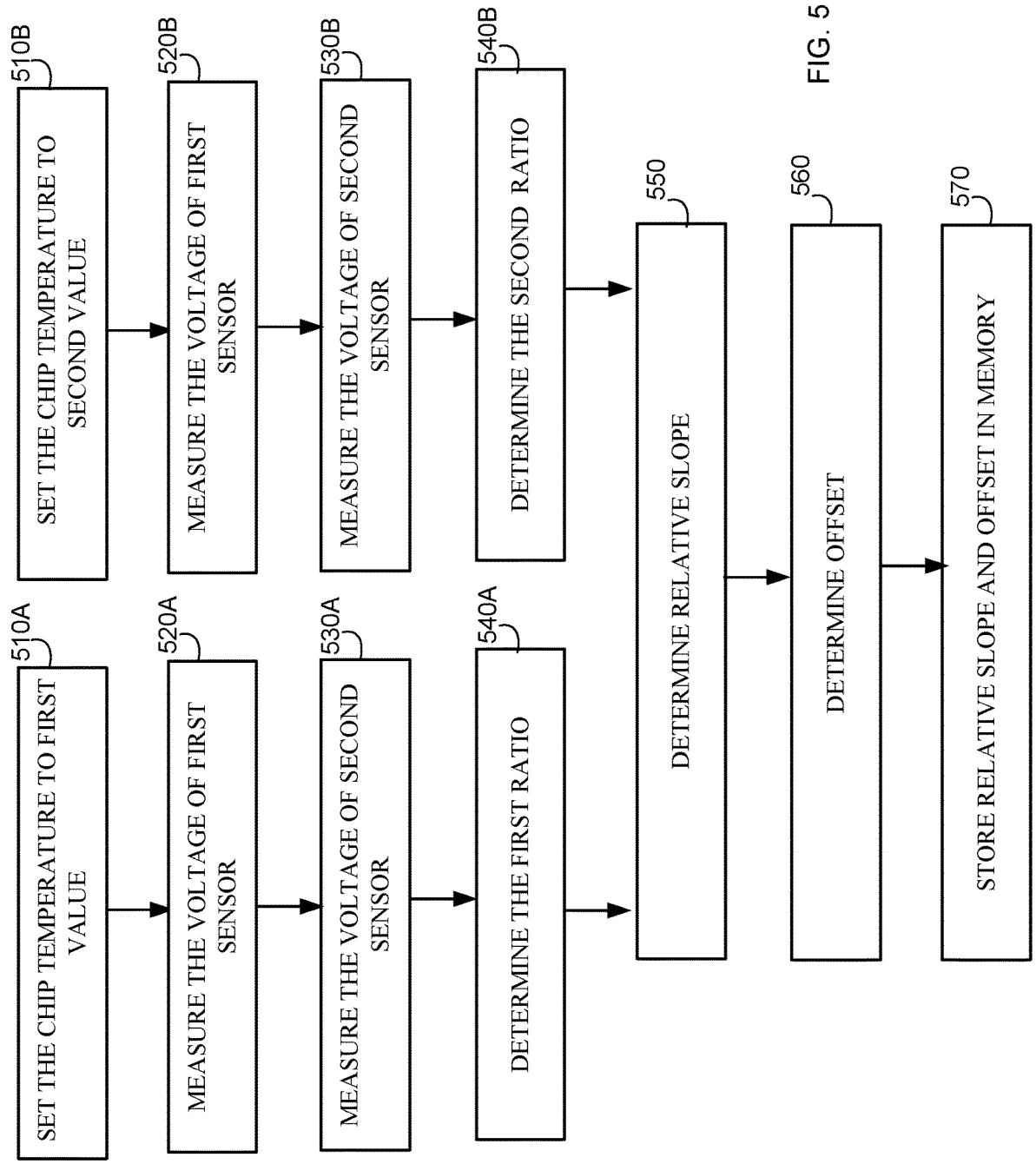
FIG. 5 is a block diagram illustrating the manner in which the first and the second parameters may be determined.

FIG. 5 is a block diagram illustrating the manner in which the first and the second parameters may be determined. In the block 510A, the chip is set to a first temperature T1. The chip may be subjected to a known temperature by placing in a controlled environment. Further, the chip may be subjected minimum operation (operating condition) that is just enough to operate the sensors 110 and 120 and measure the voltages on path 349 and 399. As a result, the possible unknown factors contributing to the temperature of the chip other than the controlled environment is minimised (or made negligible).

In block 520A, the voltage on path 349 is measured. In block 530A, the voltage on path 399 is measured. The measurement of the voltage on path 349 and 399 may be performed by sampling at one or more time instant(ces). The voltage measured on path 349 and 399 at the first temperate T1 may be referred to as V1 and V2. In block 540A, a first ratio is determined. The first ratio may be determined as R1=V1/V2.

Similarly, in the block 510B, the chip is set to a second temperature T2. In block 520B, the voltage on path 349 is measured. In block 530B, the voltage on path 399 is measured. The voltage measured on path 349 and 399 at the second temperate T2 may be referred to as V3 and V4. In block 540B, a second ratio is determined. The second ratio may be determined as R2=V3/V4

In block 550, a relative slope is determined. In one embodiment the relative slope S may be determined using the relation S=(T2−T1)/(R2−R1). In block 560, an offset is determined. In one embodiment, the offset O may be determined using a relation O=T2−(S*R2). In block 570, the ratio R1, R2, relative slope S and the offset O is stored in a memory.

Figure 6:
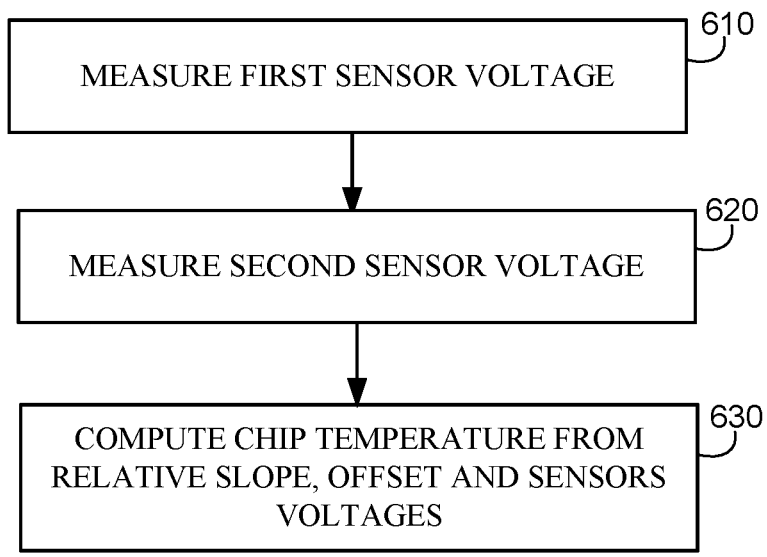
FIG. 6 illustrates the manner in which the chip temperature is determined more accurately using the relative slope S and offset O stored in the memory in one embodiment.

FIG. 6 illustrates the manner in which the chip temperature is determined more accurately using the relative slope S and offset O stored in the memory in one embodiment. In this case, chip may be operative in any operating condition and serving the purpose that is incorporated for. That means the chip may be deployed for its performance in an electronic device/system/or apparatus. The chip may be operating in conjunction and interactively with other electronic devices (together referred to as real time operating condition).

In the block 610, the voltage on path 349 is measured in a real time operating condition. In block 620, the voltage on path 399 is measured in a real time operating condition. The voltage measured on path 349 and 399 in the real time operating conditions may be referred to as VR1 and VR2. In block 630, the temperature of the chip is computed from the relative slope, the offset, the voltages on path 349 and 399. In one embodiment, the temperature of the chip in real time operating condition $T_{chip}$ is determined using the relation $T_{chip}$=(VR1/VR2)*S+O. Wherein the values of S and O are retrieved from the memory during the real time operating condition.

Figure 7:
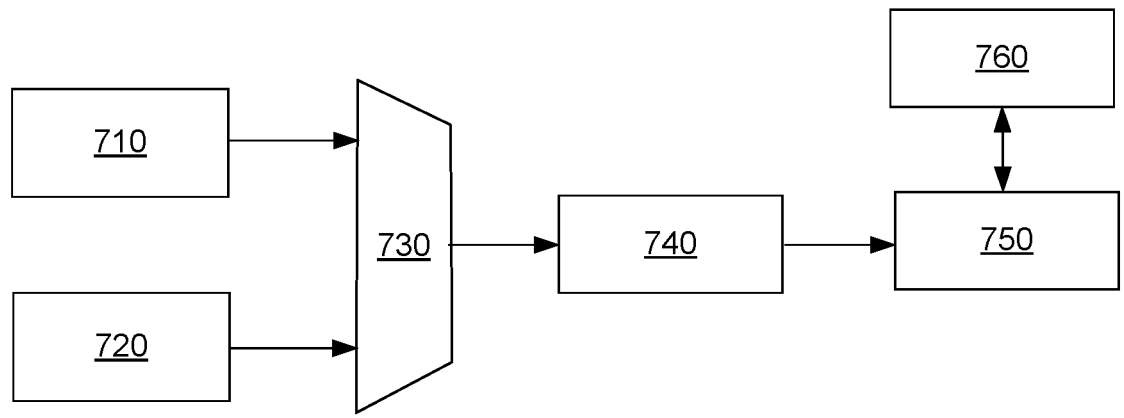
FIG. 7 is block diagram illustrating the manner in which the chip temperature sensor may be implementing in one embodiment.

FIG. 7 is block diagram illustrating the manner in which the chip temperature sensor may be implementing in one embodiment. As shown there, the source 710 and source 720 represents the two temperature sensors of different characteristics, multiplexer 730 selectively couples the voltages of one of the source 710/720 to the analog to digital convertor (ADC) 740. The ADC converts the analog voltage values to digital values for processing. Memory 760 stores data required for measuring the chip temperature. The processor 750 may be configured to perform one or more operations as disclosed below.

The processor 750 may be configured to provide control signals to the multiplexer 730, ADC 740, memory 760 and sensors 710 and 720 to operate in conjunction. Accordingly, the processor may send control signal to selectively couple one of the sources 710 and 720 to the ADC 740. The processor 750 may also control the ADC 740 to convert the analog signal from source 710 and 720 to digital values. The digital values may be stored in the memory.

Further, the processor 750 may operate in two modes, namely the calibration mode and the normal operation mode (real time operating condition). For example, the processor 750 may be configured operate in calibration mode described with reference to FIG. 5 and the processor 750 may be configured to operate in the real time operating mode as described with reference to FIG. 6. The processor 750 determines the first and the second parameter in calibration mode and determines the real time operating chip temperature in real time mode. When the determined Chip temperature in real-time operating mode exceed a threshold, the processor 750 sends warning signal or may operate to control the temperature by performing one or more remedial measure.

Figure 8:
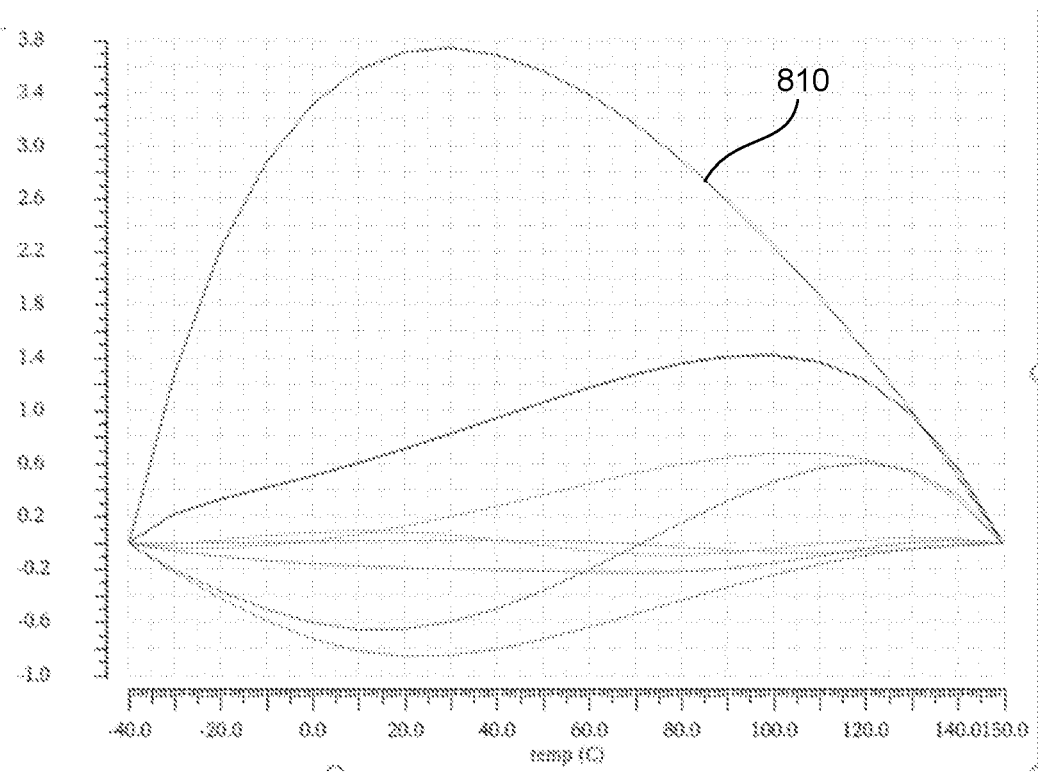
FIG. 8 is a graph illustrating the possible temperature error range.

FIG. 8 is a graph illustrating the possible temperature error range. In the graph, the X-axis representing the temperature in deg C. and Y-axis representing temperature sensor output error vs actual (in deg C.). The graph is plotted for example two-point calibration done at 150 C and −40 C. As shown there, the first order error is not present. The curve 810 depicts the second order error. While other curves representing the higher order error. As maybe seen the error diminishes at the two extremes indicating the insignificant contribution of error at the temperature of interest. Further, the second order error 810 may also be reduced or removed by performing the calibration at three temperatures instead of two temperature T1 and T2. The manner in which the three temperature calibration may be performed is further described below.

Figure 9:
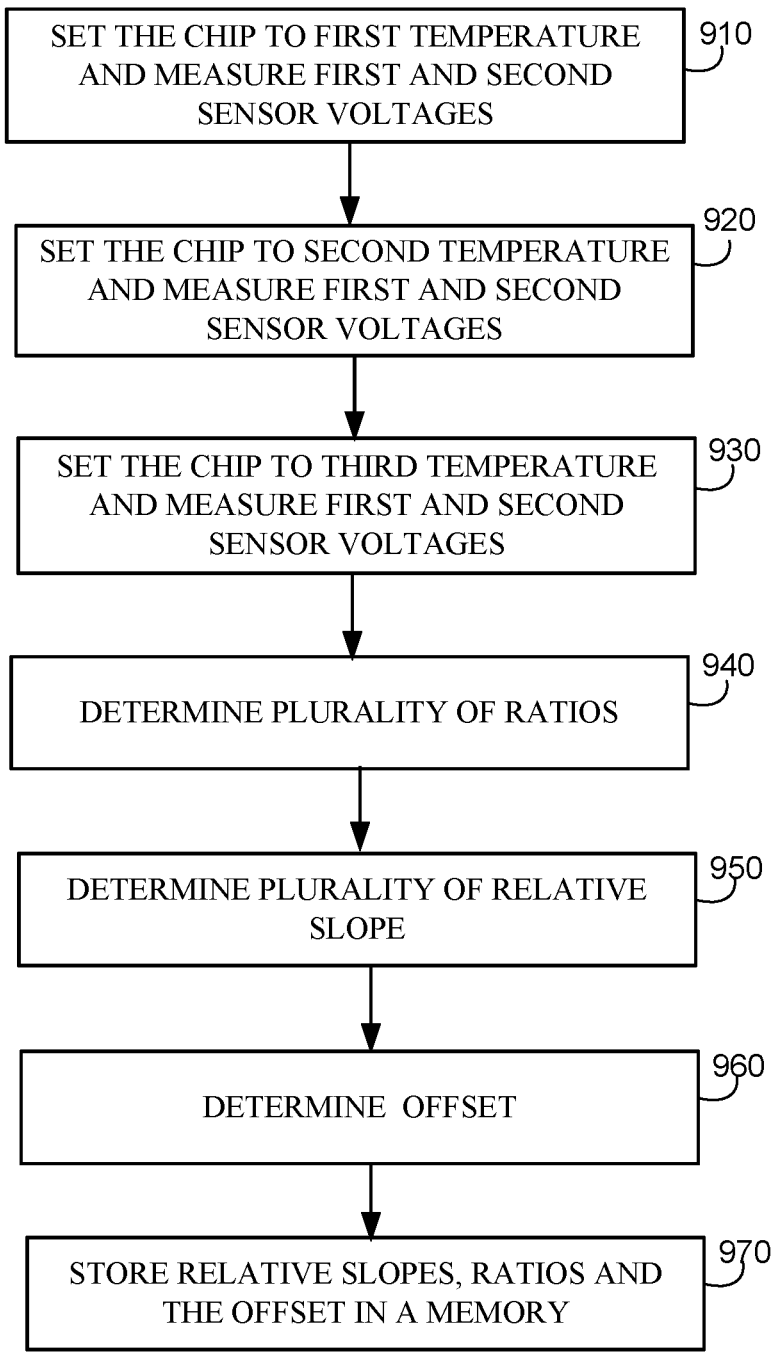
FIG. 9 is a block diagram illustrating the manner in which more than two parameters may be used to reduce the second order error.

FIG. 9 is a block diagram illustrating the manner in which more than two parameters may be used to reduce the second order error. In the block 910, the chip is set to a first temperature T1 and the voltages V1 and V2 are measured on path 349 and 399 respectively. In the block 920, the chip is set to a second temperature T2 and the voltages V3 and V4 are measured on path 349 and 399 respectively. In the block 930, the chip is set to a third temperature T3 and the voltages V5 and V6 are measured on path 349 and 399 respectively.

In block 940, plurality of ratios R1, R2 and R3 are determined. In that, R1=V1/V2, R2=V3/V4 and R3=V5/V6.

In block 950 and 960, a plurality of relative slopes and offset are determined. In one embodiment the relative slopes S1, S2, and offset O may be determined using the relation $T_{chip\_1}=R1*S1+R1^2*S2+O$, $T_{chip\_2}=R2*S1+R2^2*S2+O$ and $T_{chip\_3}=R3*S1+R3^2*S2+O$ in matrix form to solve for [S1, S2, O)] as is well known in literature.

$$\begin{pmatrix} Tchip_1 \\ Tchip_2 \\ Tchip_3 \end{pmatrix} = \begin{pmatrix} R1 & R1^2 & 1 \\ R2 & R2^2 & 1 \\ R3 & R3^2 & 1 \end{pmatrix} \begin{pmatrix} S1 \\ S2 \\ O \end{pmatrix}$$

Continuing further, in the real time mode, the chip temperature is determined more accurately using the relative slope S1, S2, ratios R1, R2, R3 and the offset O. In one embodiment, the temperature of the chip in real time operating condition $T_{chip}$ is determined using the relations: $T_{chip}=R*S1+R^2*S2+O$ where R is the ratio of sensor output voltages.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A temperature sensor in a chip for determining a temperature of the chip comprising:
    a first temperature sensor with a first characteristic, wherein the first characteristic is representing a first relation between temperature versus the electric signal strength generated by the first temperature sensor;
    a second temperature sensor with a second characteristic, wherein the second characteristic is representing a second relation between temperature versus electric signal strength generated by the second temperature sensor, first characteristic being different from the second characteristic;
    a processor operative to determine temperature of the chip is configured to determine a first parameter and a second parameter in the calibration mode and determining the chip temperature using the first parameter and the second parameter in a real time operating mode,
    wherein, the first parameter is a relative slope "S" represented as S=(T2−T1)/(R2−R1), in that, R1=V1/V2 and R2=V3/V4, in that V1 and V2 are electric signal strength in terms of voltages provided by first temperature sensor and the second temperature sensor respectively when the chip is subjected to the first temperature and V3 and V4 are electric signal strength in terms of voltages provided by first temperature sensor and the second temperature sensor respectively when the chip is subjected to the second and the second parameter is at least based on first parameter.

2. The temperature sensor of claim 1, wherein the second parameter is an offset "O" and is based on the relative slope by relation O=T2−(S*R2).

3. The temperature sensor of claim 2, further comprising a multiplexer and an analog to digital convertor (ADC), wherein the multiplexer selectively couples output of one of the first temperature sensor and the second temperature sensor to the ADC.

4. A method of determining temperature of a chip comprising:
    measuring a first voltage (V1) representing a first temperature from a first sensor in the chip;
    measuring a second voltage (V2) representing the first temperature from a second sensor in the chip;
    measuring third voltage (V3) representing a second temperature from the first sensor;
    measuring a fourth voltage (V4) representing the second temperature from the second sensor, wherein the first sensor having a first characteristic and the second sensor having the second characteristic that is being different from the first characteristic;
    determining a first parameter and a second parameter in a calibration mode and determining the chip temperature using the first parameter and the second parameter in a real time operating mode,
    wherein, the first parameter is represented as S=(T2−T1)/(R2−R1), in that, R1=V1/V2 and R2=V3/V4, when the first temperature (T1) and the second temperature (T2) are subjected to the chip in the calibration mode and the second parameter is at least based on the first parameter.

5. The method of claim 4, wherein the second parameter is an offset "O" and is based on the relative slope by relation O=T2−(S*R2).

* * * * *